April 28, 1931.  E. VINCKE  1,802,852
CORK PRODUCT AND METHOD OF MAKING THE SAME
Filed Jan. 19, 1927
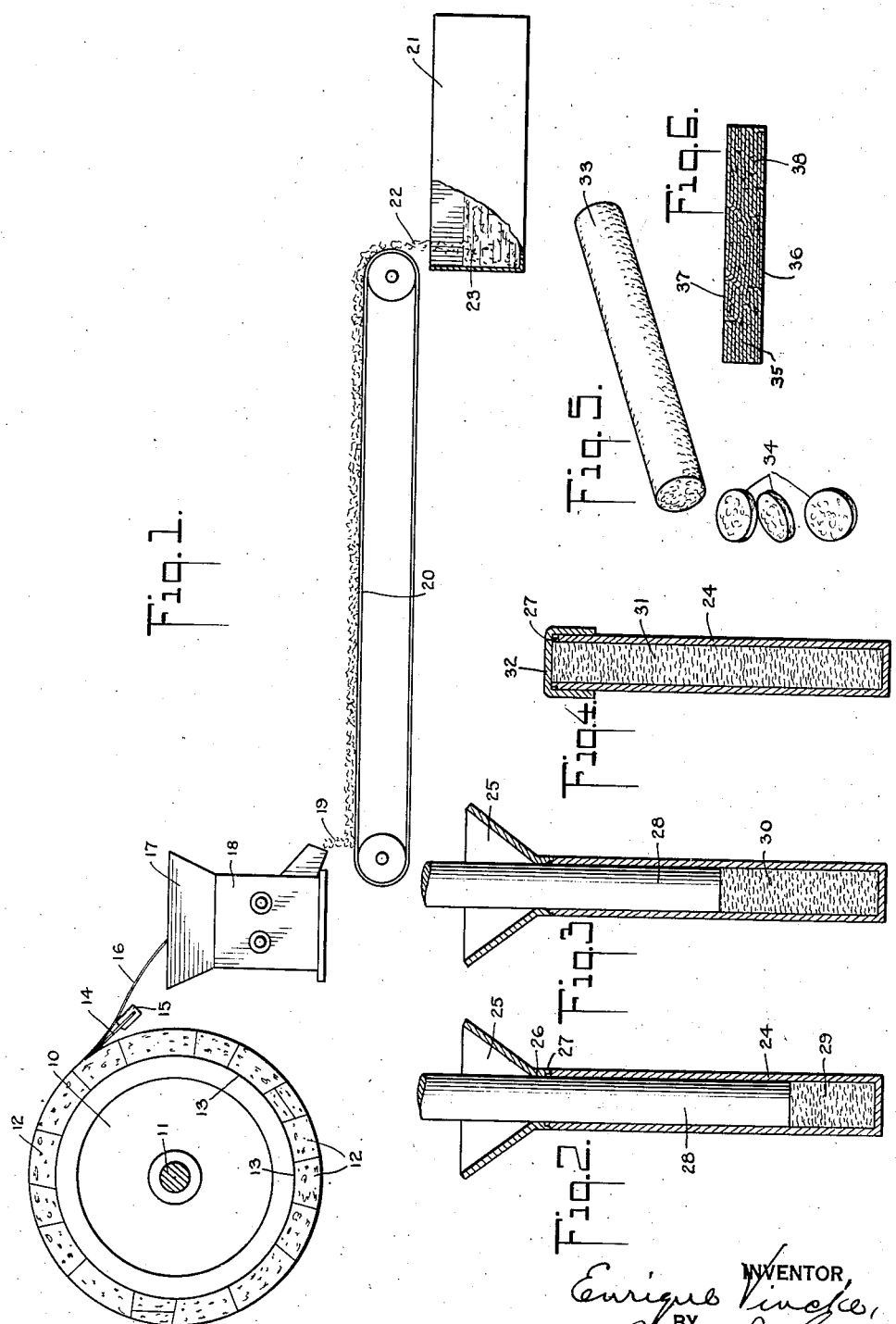

Patented Apr. 28, 1931

1,802,852

UNITED STATES PATENT OFFICE

ENRIQUE VINCKE, OF BARCELONA, SPAIN, ASSIGNOR TO MANUFACTURAS DE CORCHO, S. A., OF BARCELONA, SPAIN

CORK PRODUCT AND METHOD OF MAKING THE SAME

Application filed January 19, 1927. Serial No. 162,081.

This invention relates to improved cork products and the method of making the same.

Pursuant to my invention, the raw cork material, in the form of inherently flat formation such as flakes, scales and the like, and having a thickness considerably less than either of the two dimensions for the flat faces. Such inherently flat cork material is readily obtained by severing with a knife or the like blocks of natural cork, to thereby obtain thin sheets of cork, and then breaking up such thin sheets as by means of a grinder or equivalent machine. The resulting flat particles of cork are then admixed with a suitable adhesive such as casein, albumen or the like, and the resulting admixture is then fed into a mold of suitable formation conforming to the nature of the product desired.

A principal product of the present invention is that of disks or cushions for use in crowns or like closures for bottles of glass and like material, and in such instances, the mold is preferably of a shape to form a cylindrical rod having a cross section conforming to the desired disk or cushion, thereby enabling such disks or cushions to be obtained from such rod by merely slicing the same.

In feeding the flat cork particles into the mold, the mold is preferably subjected to vibration as by tapping with a hammer or the like to thereby locate the respective flat cork particles in face to face engagement with one another and in more or less overlapping relationship to one another. The flat cork particles are compressed in the mold to a predetermined pressure and upon completely filling the mold, the mold is then closed by means of a suitable cap. The mold and the contained charge of compressed cork are heated in an oven to the desired temperature to effect the bonding of the cork particles to one another at the predetermined pressure. The mold and the contained resulting rod are allowed to cool, whereupon the rod is withdrawn from the mold and the disks or cushions of desired thickness are derived therefrom by cutting the rod transversely to its axial length.

The resulting disk or cushion is composed of flat cork particles bonded with their flat faces in contact with one another and in more or less overlapping relation with one another. Each disk or cushion is made up of a relatively large number of flat particles superposed upon one another depending upon the thickness of the individual particles and the degree of compression, the opposite flat faces of each disk or cushion being substantially uniplanar and substantially devoid of pores within the contour of the respective cork particles and also devoid of spaces between the adjacent particles.

By my invention, cork wood of the "inferior" grades as well as cork wood of the "superior" grades is utilized to substantially 100% of the average harvest in the manufacture of disks or cushions, each and all of which are substantially devoid of pores or other openings through the resulting disk or cushion, and further yielding a product which possesses characteristics including resiliency comparable to those of the "superior" grades of natural cork.

Further features and objects of my invention will be more fully understood from the following detail description and the accompanying drawings, in which Fig. 1 is a diagrammatic view showing one form of procedure for deriving subdivided, inherently flat cork particles from natural cork wood and for mixing therewith the desired adhesive;

Fig. 2 shows in central sectional view of a form of mold, in which cork particles have been tamped to any predetermined pressure for a partial charge;

Fig. 3 is a view similar to Fig. 2 but showing a larger charge in the mold compressed at the same predetermined pressure.

Fig. 4 is a central vertical section of the mold, showing the same fully charged at the predetermined pressure, and closed by a suitable cap;

Fig. 5 is a perspective view showing diagrammatically a baked cork rod, from which disks or cushions are being cut; and Fig. 6 is a central sectional view, on an enlarged scale, of a disk or a cushion, to show the internal formation of the same.

As above indicated, my invention has a principal object of using cork wood of the "inferior" grades with cork wood of the "superior" grades for the manufacture of cork products and particularly disks or cushions for bottle closures.

As one manner of commercially carrying out my invention, I describe the following procedure in relation to the steps illustrated in the drawings. On a drum 10 of wood or the like, journalled on the shaft 11, I mount blocks 12 of cork wood side by side, in more or less close adjacency; the individual blocks are secured at their lower faces 13 by glue or other adhesive to the outer cylindrical surface of the drum 10. Such blocks 12 are natural cork wood of more or less uniform dimensions and are of the various grades as obtained in the regular harvest, and are placed side by side irrespective of the relative grades. In the normal yield of cork wood, the proportion of corkwood of the "inferior" grades to cork wood of the "superior" grades is approximately forty per cent to sixty per cent. By such term "superior" grade is defined such grades that upon cutting disks or cushions therefrom for bottle closures by machine or like prior art procedure, the proportion of derived liquid-proof and gas-proof disks or cushions is at least eighty per cent.

Sheets of cork of the desired thickness are attained from the peripherally mounted blocks 12 by the use of a knife 14, or equivalent, mounted on a suitably adjusted, supporting frame 15, to position the edge of the knife at the proper radial distance from the axial center of the drum 10, and regulated as the blocks 12 are severed.

The severed sheets of cork, indicated at 16, are fed in any suitable manner into the hopper 17 of a grinder 18 or other suitable machine for breaking up the sheets 16 into small flat pieces. Such grinder 18 usually comprises a pair of rolls journalled side by side, with their axes parallel and having corresponding projections and depressions whereby the sheets 16, are "broken" up into flat scales, flakes or the like, having substantially uniform thickness, i. e., the thickness of the sheets 16 determined by the cutting knife 14, such thickness being considerably less than either of the dimensions of the flat faces of each particle. Such flat particles are inherently flat and with the opposite flat faces substantially parallel to one another. The flat particles, indicated at 16, are delivered in any suitable manner, as by an endless conveyer 20, to a tank 21 or other suitable container. In such tank 21 or other container suitable adhesive is mixed with the flat cork particles, either by feeding the particles, as is indicated at 22, from the conveyer 20 into a bath 23 of the adhesive and then agitating, or by feeding the flat cork particles and adhesive in corresponding amounts jointly into a tank 21 or other container.

Upon forming the desired admixture of flat cork particles having their flat faces substantially wholly coated with the adhesive, such admixture is fed into a suitable mold represented generally at 24, see Fig. 2. In the instance of the manufacture of disks or cushions the mold may be cylindrical in shape and its interior is of a diameter corresponding to that of the resulting disk or cushion. To facilitate feeding the cork-adhesive admixture, I may employ a funnel shaped hopper 25, the inner lip of which forms a close fit with the inner face of the mold 24, as by rabbeting as indicated at 26 the lower edge of the hopper and also rabbeting the upper edge of the mold 24, as is indicated in 27.

The mold 24 is filled by partial charging. A tamping tool 28 is employed to compress each partial charge to the predetermined pressure. A compressed partial charge at an initial stage of charging is indicated at 29 in Fig. 2. The tamping tool 28 is then withdrawn, and an additional charge of the adhesive-cork mixture is added, whereupon the tamping tool 28 is again re-inserted within the mold 24 to compress the added charge to the aforesaid predetermined pressure; the increased compressed charge, compressed wholly to the predetermined pressure is indicated at 30 in Fig. 3. By similar additional charging and repeated tamping to the same predetermined pressure, the mold 24 is finally completely filled, as is indicated at 31 in Fig. 3. Such complete charge of adhesive-cork admixture is compressed throughout to the predetermined pressure. Upon withdrawing the hopper 25 a cap 32 or equivalent is locked over the opening of the mold 24. The mold 24 and the enclosed adhesive-cork mixture 31 is then placed in an oven and baked to the desired temperature. During such baking operation the adhesive is matured to its bonding state, whereby the cork particles under pressure with their flat faces in immediate contact with one another are bonded as a mass to form a rod, as is indicated at 33 in Fig. 5.

Upon completion of the baking stage and the cooling of the mold and the enclosed resulting rod, the rod 33 is withdrawn from the mold 24.

Disks 34 or cushions are formed from the rod 33, in any desired manner, as by cutting the rod 33 at right angles to its axis and at locations corresponding to the desired thickness of the disks or cushions.

The inner diameter of the mold is selected to correspond to the diameter of the desired disk or cushion which in turn corresponds to the inner diameter of a crown closure, and similarly for other cork products.

In Fig. 6, I have shown in a somewhat exaggerated form a disk or cushion resulting from my invention. The opposite flat faces 36, 37, are substantially uniplanar and substantially parallel to one another. By reason of the uniform flat formation of each constituent cork particle, as is indicated at 38, the flat faces of substantially the major portion of substantially all of the cork particles 38 lie substantially parallel to the flat faces 36, 37 of the disk or cushion. Also, by reason of the flat particles being of varying length and breadth as to their flat faces, any inter-spaces between the respective adjacent flat particles are located out of alignment or register with one another, thereby precluding the presence of any set or series of openings communicating with one another from one flat face of a disk 34 through the interior of the disk or cushion to the opposite flat face, thereby rendering substantially each or all of the disks or cushions gas-proof and liquid-proof.

The resiliency of the flat cork particles forming the mass of each disk or cushion is of a high order and compares favorable with that of the "superior" grades of natural cork.

It is preferable in the step of breaking up the cork sheets to preserve the sheet formation, that is to say, to break up the cork sheets by grinding, as above described, or by cutting, chipping or the like to reduce the size of the sheet by such severing operation without disturbing the flake formation, and thereby derive flat particles of substantially uniform thickness.

In the formation of the sheets of cork, the blocks of natural cork may be mounted on the drum or equivalent to locate the plane of severing substantially parallel to the yearly layers, whereby the coefficient of flexibility of resulting cork disk or cushions is increased.

Other cork products may be formed from my improved molded product by the usual procedure. Thus, to form sheets of molded cork, my product is molded of appropriate thickness, and the sheets are cut therefrom for the desired thickness or thicknesses. Such cut sheets of my cork product are useful for gasket purposes, as in automobile engines and gasket uses generally.

Likewise, tapered corks and the cork products may be cut from my improved molded cork product. In a similar manner, the sheets cut from my molded cork product may be of reduced thickness for deriving so-called "tipping" cork material, that is to say, for use as tips for cigarettes and the like. Such severed sheets may be cut of appropriate width and the sheets attached to one another by adhesive or the like to form a ribbon of indefinite length, which may be rolled into rolls.

In the production of cork products of the various forms embodying my present invention, the bonding between the mutually engaging flat particles is partially effected by the "felting" action arising between the cellular structures. By reason of such physical bonding between the individual particles with one another and therewith of the whole mass of particles, I have discovered that a greatly reduced quantity of adhesive is required to complete the bonding of the respective particles to form the mass of any particular product, and in many instances, the amount of adhesive may be reduced to a quantity less than one-tenth of the adhesive required pursuant to prior practices.

Whereas, I have described my invention by reference to specific forms thereof, it will be understood that many changes and modifications may be made without departing from the spirit of the invention.

I claim:

1. A cork product having a flat face, comprising particles of natural cork, each particle having in natural state substantially parallel, opposite faces the dimensions of which are considerably greater than the thickness of the particles, said particles being disposed in overlapping relation to one another with respect to successive layers and bonded to one another by adhesive, said opposite faces of said flat particles being disposed substantially parallel to said flat face of the cork product.

2. A cork product having a flat face, comprising particles of natural cork, each particle having in natural state substantially parallel, opposite faces the dimensions of which are considerably greater than the thickness of the particles, said particles being disposed in overlapping relation to one another with respect to successive layers and bonded to one another by adhesive and by the felting action of the cork particles with one another, said opposite faces of said flat particles being disposed substantially parallel to said flat face of the cork product.

3. A cork product having a flat face, comprising particles of natural cork, each particle having in natural state substantially parallel, opposite faces the dimensions of which are considerably greater than the thickness of the particles, said particles being disposed in overlapping relation to one another with respect to successive layers and bonded to one another by adhesive, the opposite sides of said flat particles being substantially parallel to the opposite flat faces of the cork product.

In testimony whereof I have signed this specification this sixth day of December, 1926.

ENRIQUE VINCKE.